(12) United States Patent
Eyring et al.

(10) Patent No.: US 12,444,628 B2
(45) Date of Patent: Oct. 14, 2025

(54) IMAGE MODELING-ASSISTED CONTOUR EXTRACTION

(71) Applicant: KLA CORPORATION, Milpitas, CA (US)

(72) Inventors: Stefan Eyring, Weilburg (DE); Zhijin Chen, Milpitas, CA (US); Frank Laske, Weilmunster (DE)

(73) Assignee: KLA CORPORATION, Milpitas, CA (US)

( * ) Notice: Subject to any disclaimer, the term of this patent is extended or adjusted under 35 U.S.C. 154(b) by 454 days.

(21) Appl. No.: 17/849,554

(22) Filed: Jun. 24, 2022

(65) Prior Publication Data

US 2023/0420278 A1   Dec. 28, 2023

(51) Int. Cl.
*H01L 21/67* (2006.01)
*G06T 7/00* (2017.01)

(52) U.S. Cl.
CPC ...... *H01L 21/67276* (2013.01); *G06T 7/0004* (2013.01); *G06T 2207/30148* (2013.01)

(58) Field of Classification Search
CPC ............. H01L 21/67276; G06T 7/0004; G06T 2207/30148; G06T 2207/10061; G06T 7/001
See application file for complete search history.

(56) References Cited

U.S. PATENT DOCUMENTS

| | | | |
|---|---|---|---|
| 10,185,800 B2 | 1/2019 | Eyring et al. | |
| 10,901,325 B2 | 1/2021 | Gurevich et al. | |
| 2007/0187595 A1 | 8/2007 | Tanaka et al. | |
| 2013/0166240 A1 | 6/2013 | Shishido et al. | |
| 2015/0110384 A1 | 4/2015 | Luoh et al. | |
| 2015/0212019 A1 | 7/2015 | Shishido et al. | |
| 2018/0218492 A1* | 8/2018 | Zhang | G06T 7/0006 |
| 2018/0293721 A1* | 10/2018 | Gupta | G06N 3/045 |
| 2022/0042936 A1* | 2/2022 | Okai | G06N 3/045 |
| 2022/0137514 A1* | 5/2022 | Wang | G03F 7/70625 355/53 |
| 2022/0404712 A1* | 12/2022 | Zhang | G06T 7/337 |
| 2023/0401727 A1* | 12/2023 | Wang | G03F 7/705 |

FOREIGN PATENT DOCUMENTS

KR    20220030897 A    3/2022

OTHER PUBLICATIONS

Villarrubia et al. 3D Monte Carlo Modeling of the SEM: Are There Applications to Photomask Metrology, Proc. of SPIE, 2014, 923602-1 to 923602-12, vol. 9236.

WIPO, International Search Report for International Application No. PCT/US2023/024218, Sep. 26, 2023.

* cited by examiner

*Primary Examiner* — Iriana Cruz

(74) *Attorney, Agent, or Firm* — Hodgson Russ LLP

(57) ABSTRACT

A wafer metrology tool, such as a scanning electron microscope, can generate an image of a structure on a wafer. A simulated image of the structure also is determined from a design of the wafer. A contour of the structure in the image and a contour of the structure in the simulated image are determined. These contours are compared.

14 Claims, 3 Drawing Sheets

IMAGE MODELING-ASSISTED CONTOUR EXTRACTION

FIELD OF THE DISCLOSURE

This disclosure relates to semiconductor metrology.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Metrology processes are used at various steps during semiconductor manufacturing to monitor and control the process. Metrology processes are different from inspection processes in that, unlike inspection processes in which defects are detected on wafers, metrology processes are used to measure one or more characteristics of the wafers that cannot be determined using existing inspection tools. Metrology processes can be used to measure one or more characteristics of wafers such that the performance of a process can be determined from the one or more characteristics. For example, metrology processes can measure a dimension (e.g., line width, thickness, etc.) of features formed on the wafers during the process. In addition, if the one or more characteristics of the wafers are unacceptable (e.g., out of a predetermined range for the characteristic(s)), the measurements of the one or more characteristics of the wafers may be used to alter one or more parameters of the process such that additional wafers manufactured by the process have acceptable characteristic(s).

Metrology tools are designed to make many different types of measurements for semiconductor manufacturing such as measuring characteristics of one or more targets. These characteristics can include, for example, critical dimensions (CDs), overlay, sidewall angles, film thicknesses, line edge roughness (LER), line width roughness (LWR), pattern placement errors, or process-related parameters (e.g., focus and/or dose). The targets can include certain regions of interest that are periodic in nature, such as, for example, gratings in a memory die. The metrology targets may possess various spatial characteristics and are typically constructed of one or more cells that may include features in one or more layers printed in one or more lithographically-distinct exposures. The targets or the cells may possess various symmetries such as two-fold or four-fold rotation symmetry and/or reflection symmetry. Different cells or combinations of cells may belong to distinct layers or exposure steps. The individual cells may comprise either isolated non-periodic features or, alternatively, they may be constructed from one, two, or three-dimensional periodic structures or combinations of non-periodic and periodic structures. The periodic structures may be non-segmented or they may be constructed from finely segmented features that can be at or close to the minimum design rule of the lithographic process used to print them. The metrology targets may also be collocated or in close proximity with dummification structures in the same layer or in a layer above, below, or in between the layers of the metrology structures. Targets can include multiple layers (or films) whose thicknesses can be measured by the metrology tool. Targets can include target designs placed (or already existing) on the semiconductor wafer for use (e.g., with alignment and/or overlay registration operations). Certain targets can be located at various places on the semiconductor wafer. For example, targets can be located within the scribe lines (e.g., between dies) and/or located in the die itself. In certain embodiments, multiple targets are measured at the same time or at differing times by the same or multiple metrology tools. The data from such measurements may be combined. Data from the metrology tool is used in the semiconductor manufacturing process to feed-forward, feed-backward, and/or feed-sideways corrections to the process (e.g., lithography, etch) and, therefore, might yield a complete process control solution.

Extracting the contour or shape of a structure on the wafer can be part of the semiconductor manufacturing process. Previous techniques typically used high-resolution images (e.g., top layer images of a CD scanning electron microscope (SEM) with a small beam size) and applied a contour-detection algorithm (e.g., grayscale thresholding) to extract the shape of the pattern. The accuracy of this previous technique is limited by the imaging properties like beam size, pixel size, or noise. In particular, edge blur caused by the limited resolution of the image (e.g., due to the beam size/shape) can directly impact the position of the contour which is reported incorrectly. CD SEMs in the semiconductor industry today use low landing energies to achieve a high resolution. Thus, these CD SEMs can only measure layers at the surface. Higher resolutions can be achieved with lower beam currents, but this reduces throughput.

Improved systems and techniques are needed.

BRIEF SUMMARY OF THE DISCLOSURE

A system is provided in a first embodiment. The system includes a particle beam source that generates a particle beam; a stage configured to hold a wafer in a path of the particle beam; a detector that receives particles from the wafer; and a processor in electronic communication with the detector. The processor is configured to: receive an image of a structure on the wafer; determine a contour of a structure in the image of the wafer; determine a simulated image of the structure from a design of the wafer; determine a contour of the structure in the simulated image; and compare the contour of the structure in the image and the contour of the structure in the simulated image. The simulated image accounts for noise sources and imaging properties of the system.

The system can be a scanning electron microscope. In an instance, the particles are electrons and the particle beam is an electron beam.

The processor can be further configured to determine a difference in polygons between the contour of the structure in the image and the contour of the structure in the simulated image. The processor also can be further configured to determine a modified design of the structure based on the difference in polygons.

In an instance, the processor also can be further configured to: determine a second simulated image of the structure from the modified design; determine a contour of the structure in the second simulated image; and compare the contour of the structure in the image and the contour of the structure in the second simulated image. The second simulated image accounts for noise sources and imaging properties of the wafer metrology tool.

The processor can be further configured to report the difference in polygons when the difference in polygons is below a threshold.

A method is provided in a second embodiment. The method includes directing a particle beam at a wafer using a wafer metrology tool. An image of the wafer is generated based on particles reflected from the wafer using a processor. A contour of a structure in the image of the wafer is determined using the processor. A simulated image of the structure from a design of the wafer is determined using the processor. The simulated image accounts for noise sources and imaging properties of the wafer metrology tool. A contour of the structure in the simulated image is determined using the processor. The contour of the structure in the image and the contour of the structure in the simulated image is compared using the processor.

The wafer metrology tool can be a scanning electron microscope. In an instance, the particle beam is an electron beam and the particles are electrons.

The method can further include determining a difference in polygons between the contour of the structure in the image and the contour of the structure in the simulated image using the processor.

The method can further include determining a modified design of the structure based on the difference in polygons using the processor.

In an instance, the method further includes determining, using the processor, a second simulated image of the structure from the modified design; determining, using the processor, a contour of the structure in the second simulated image; and comparing, using the processor, the contour of the structure in the image and the contour of the structure in the second simulated image. The second simulated image accounts for noise sources and imaging properties of the wafer metrology tool.

The method can further include reporting the difference in polygons when the difference in polygons is below a threshold.

A non-transitory computer readable medium storing a program can be configured to instruct a processor to execute the method of the second embodiment.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein extract the contour or other shape of a pattern on a substrate (e.g., wafer or photomask) using an image. The image can be from, for example, an SEM. The image can be acquired with a lower resolution compared to conventional methods. Accuracy is achieved using an image modeling algorithm (e.g., Die-To-Database (D:DB) produced by KLA Corporation) to take the imaging properties into account. A larger beam size or through-stack imaging of a buried layer can be performed with the lower resolution. The shape/contour can be used to extract various properties like edge placement errors (relative to the design intent) or the distance between two adjacent edges. Contour extraction is combined with an image modeling algorithm that enable modeling of image properties. This can improve accuracy. A design clip can be configured to match a contour extracted from a simulated image to a contour extracted from measured image.

Figure 1:
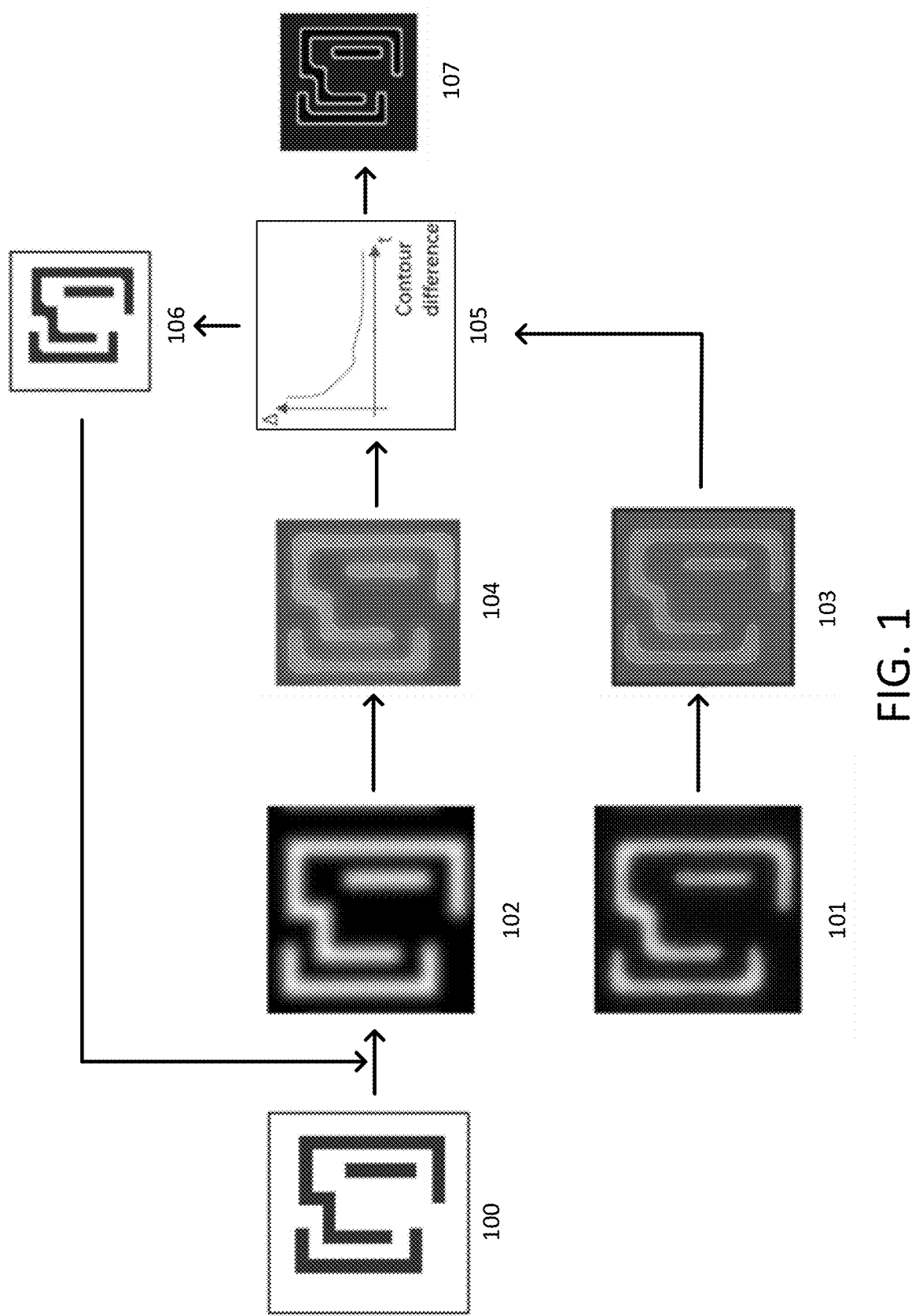
FIG. 1 is a diagram showing an exemplary embodiment according to the present disclosure.
Figure 2:
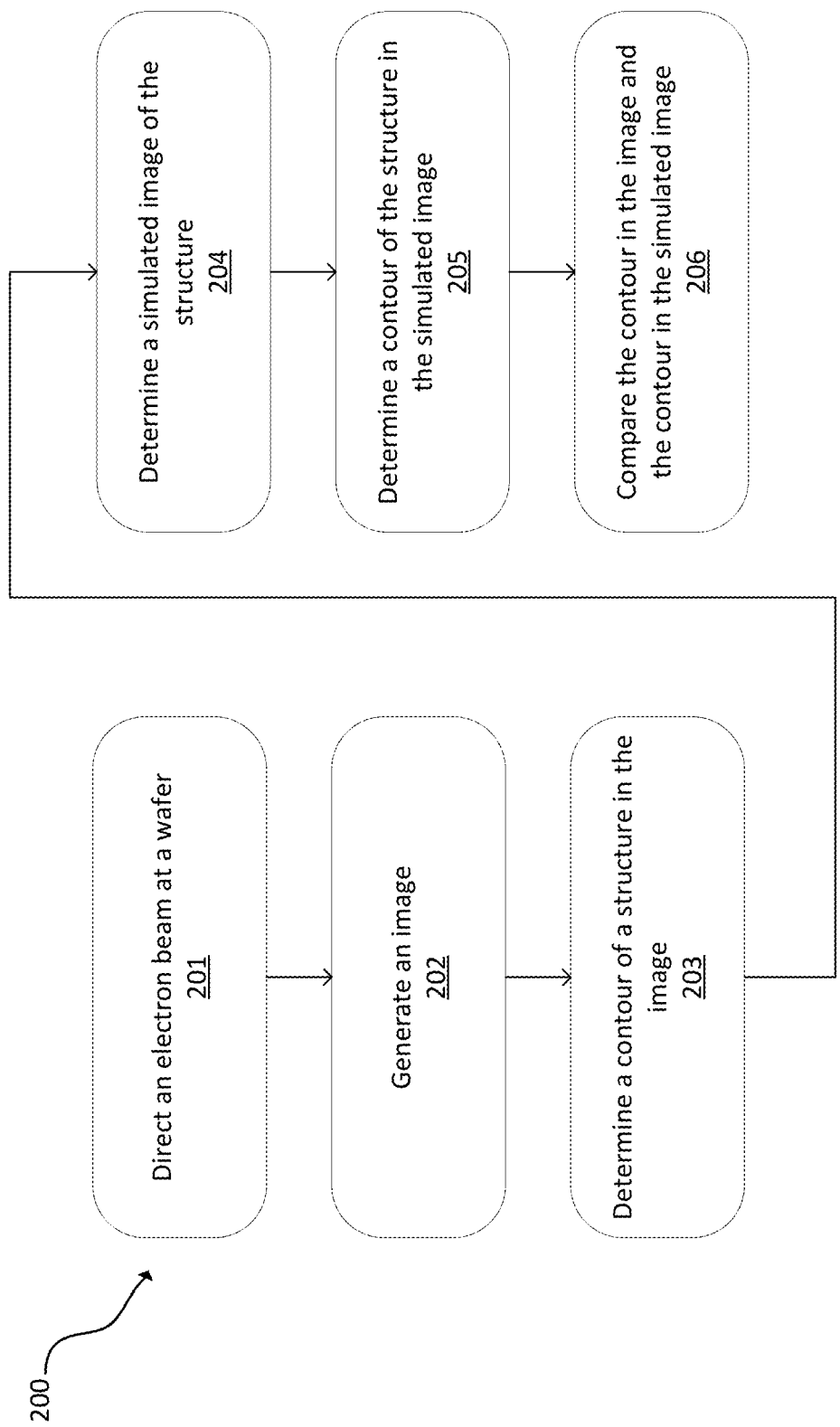
FIG. 2 is a flowchart of a method of an embodiment according to the present disclosure.

FIG. 1 is a diagram showing an exemplary embodiment. FIG. 2 is a flowchart of a method 200. Some or all of the steps of the method 200 can use a processor.

In method 200, an electron beam is directed at a wafer using a wafer metrology tool at 201. The wafer metrology tool can be an SEM or another system. An image of the wafer based on electrons reflected from the wafer is generated at 202. As shown in FIG. 1, this generates the image 101. The image 101 includes process variation and/or noise.

A contour of a structure in the image of the wafer can be determined at 203. This generates the contour 103 in FIG. 1. In an instance, the contour 103 is extracted from the image 101 using a thresholding algorithm. For example, Canny-Edge-Detection can be used with a fixed threshold to generate the contour 103. The contour 103 can be used as reference contour. The contour 103 can be subject to resolution and imaging properties (e.g., blur) of the underlying tool that generated the image 101. The image 101 may be a top view of the structure on the wafer, so the contour likewise can be a top view of the structure. Other imaging angles for the image 101 are possible.

A simulated image of the structure from a design of the wafer can be determined at 204. The simulated image accounts for noise sources and imaging properties of the wafer metrology tool. In FIG. 1, a design 100 is shown. This design 100 is used to determine the simulated image 102, which includes resolution-induced accuracy error. An example of generating simulated images is disclosed in Villarrubia et al., "3D Monte Carlo Modeling of the SEM: Are There Applications to Photomask Metrology" (2014), which is incorporated by reference.

The simulated image 102 can be determined from noise sources and imaging properties of the wafer metrology tool and the design of the wafer. A tool model can be applied to account for tool properties, such as imaging characteristics, beam characteristics (e.g., beam jitter), and/or tool noise (e.g., shot noise or stage jitter). The simulated image 102 is the expected result of the design intent after considering the tool properties. Thus, the simulated image 102 can be an ideal measurement given the associated, for example, stage jitter on a tool.

In an instance, the edges in the design file (e.g., design 100) are infinitely sharp and binary. This can show the inside of structure versus the outside of a structure. The model to determine the simulated tool signal can include an amplitude and offset of a signal inside a structure and outside of a structure. The model to determine the simulated image 102 also can include beam properties for edge shape. These beam properties can be similar to a point-spread-function in optics.

The design 100 can be, for example, a design clip in OASIS format or another format. The simulated image 102 can use information such as imaging setup (e.g., pixel size, beam properties) and/or tool properties (e.g., pre-calibrated tool, imaging model). The model can account for imaging properties like resolution or layer interaction when forming the simulated image 102. In an instance, a neural network can be used to generate the simulated image 102.

In an instance, a render engine is used to determine the simulated image 102 from the design 100. Modeling using the render engine can use physical modeling, Monte-Carlo simulation-based modeling, machine learning-based modeling (e.g., generative adversarial networks or graph neural network), or other techniques. The simulated image 102 of the design-intent can be how an image of the design 100 would look like with process variation, tool noise, etc.

A contour of the structure in the simulated image can be determined at 205. This generates the contour 104 in FIG. 1 from the simulated image 102. In an instance, the same model can be used to generate the contour 103 and the contour 104.

The contour of the structure in the image and the contour of the structure in the simulated image are compared at 206. In FIG. 1, this generates the contour difference 105 (i.e., "Δcontour"). For example, the contour difference 105 can be determined in a block-wise manner where each segment is broken down into identical blocks (e.g., with a fixed block size). In another example, the contour difference 105 can be determined in a vertex-wise manner where vertices along the contour (mathematically described as polygons) are matched to each other.

The comparison also can include a quality factor related to the cost function. The quality factor can be, for example, a root mean square value or a mean absolute difference. An objective of the closed-loop optimization can be to minimize a cost function that generates this quality factor.

A difference in polygons between the contour 103 of the structure in the image 101 and the contour 104 of the structure in the simulated image 102 can be determined. In an instance, a modified design 106 of the structure is determined using the difference in polygons. For example, the Δcontour can be applied to the design 100 to generate the modified design 106. Application of the Δcontour can depend on if the contour difference 105 is determined in a block-wise manner or a vertex-wise manner. For a block-wise manner, the application can include block-wise movement of edge segments of the design 100 in the direction given by Δcontour (e.g., X direction). For a vertex-wise manner, the application can include moving a vertex of the design 100 in the direction given by Δcontour (e.g., given as a 2D vector).

As shown in FIG. 1, a closed-loop optimization can be used to minimize the contour difference between the image 101 and the simulated image 102. A second simulated image of the structure can be determined from the modified design 106. The second simulated image can account for noise sources and imaging properties of the wafer metrology tool. A contour of the structure of the second simulated image can be determined. Then, the contour 103 of the structure in the image 101 can be compared to the contour of the structure in the second simulated image. This process can be repeated until the contour difference is below a threshold. For example, the threshold can be a quality criterion, which may be a convergence or a maximum number of iterations. In a specific example, the process is repeated until the contour difference matches except for noise. Thus, the modified design 106 can match the structure that actually appears on the wafer. The modified design 106 can be used to avoid errors caused by imaging properties.

In an instance, the difference in polygons can be reported when the difference in polygons is below a threshold. For example, this can result in an optimal contour and/or design, such as the contour/design 107 in FIG. 1. This can be reported as an edge placement error, line edge roughness, or other feature versus the design.

The contour/design 107 can be a modified design clip that includes the extracted contour. The contour/design 107 can be used as a design clip to avoid errors caused by imaging properties of the tool. Optionally, the contour/design 107 can include a report of any remaining, unaccounted difference in Δcontour that might be still present after the optimization meets the stop criterion.

The embodiments in FIGS. 1-2 account for imaging properties. The extracted contour can be independent of the imaging properties and, thus, more accurate at various imaging conditions. Low-resolution imaging conditions (e.g., faster measurements or through-stack measurements) can accurately report contours using the contour/design 107.

In an instance, contour extraction can be enabled on high beam current, high voltage SEMs that use high landing energies to measure buried layers and multiple layers at once and/or can use high beam currents for fast measurements (e.g., surface layer and/or buried layer). This can be at least ten times faster than a standard operation on a CD SEM. Through-stack contour extraction is possible. Direct multilayer edge placement error metrology also is possible.

In another embodiment, image comparison techniques are used to detect Δcontour with a quality factor instead of contour extraction. In this embodiment, the difference is the measured image (e.g., image 101) minus the simulated image (e.g., simulated image 102). The difference compensates for overlay. Looking at a greyscale image of the difference can show if shifting locations around the design clip may be needed. Edge placement properties (e.g., overlay, CD, LER) can cause or form the differences. Thus, these edge placement properties can be extracted.

Figure 3:
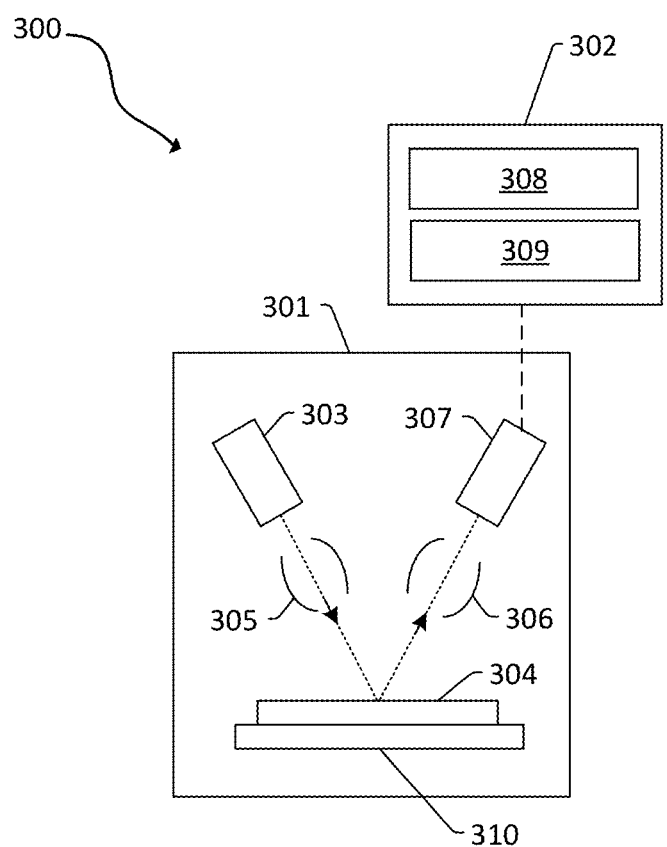
FIG. 3 a block diagram of an exemplary system in accordance with the present disclosure.

FIG. 3 is a block diagram of an embodiment of a system 300. The system 300 includes a wafer metrology tool (which includes the electron column 301) configured to generate signals of a wafer 304. While the signal can be an image, other data is possible.

The wafer metrology tool includes an output acquisition subsystem that includes at least an energy source and a detector. The output acquisition subsystem may be an electron beam-based output acquisition subsystem. For example, in one embodiment, the energy directed to the wafer 304 includes electrons, and the energy detected from the wafer 304 includes electrons. In this manner, the energy source may be an electron beam source. In one such embodiment shown in FIG. 3, the output acquisition subsystem includes electron column 301, which is coupled to computer subsystem 302. A stage 310 may hold the wafer 304 or another type of sample.

As also shown in FIG. 3, the electron column 301 includes an electron beam source 303 configured to generate electrons that are focused to wafer 304 by one or more elements 305. The electron beam source 303 may include, for example, a cathode source or emitter tip. The one or more elements 305 may include, for example, a gun lens, an anode, a beam limiting aperture, a gate valve, a beam current selection aperture, an objective lens, and a scanning subsystem, all of which may include any such suitable elements known in the art.

Electrons returned from the wafer 304 (e.g., secondary electrons) may be focused by one or more elements 306 to detector 307. One or more elements 306 may include, for example, a scanning subsystem, which may be the same scanning subsystem included in element(s) 305.

The electron column 301 also may include any other suitable elements known in the art.

Although the electron column 301 is shown in FIG. 3 as being configured such that the electrons are directed to the wafer 304 at an oblique angle of incidence and are scattered from the wafer 304 at another oblique angle, the electron beam may be directed to and scattered from the wafer 304 at any suitable angles. In addition, the electron beam-based output acquisition subsystem may be configured to use multiple modes to generate signals of the wafer 304 (e.g., with different illumination angles, collection angles, etc.). The multiple modes of the electron beam-based output acquisition subsystem may be different in any signal generation parameters of the output acquisition subsystem.

Computer subsystem 302 may be coupled to detector 307 as described above. The detector 307 may detect electrons returned from the surface of the wafer 304 thereby forming signals related to the wafer 304. The signals may include any suitable electron beam images or other data. Computer subsystem 302 may be configured to perform any of the functions described herein using the output of the detector 307 and/or the signals. Computer subsystem 302 may be configured to perform any additional step(s) described herein. A system 300 that includes the output acquisition subsystem shown in FIG. 3 may be further configured as described herein.

It is noted that FIG. 3 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the output acquisition subsystem is described above as being an electron beam-based output acquisition subsystem, the output acquisition subsystem may be an ion beam-based or neutral-beam based output acquisition subsystem. Such an output acquisition subsystem may be configured as shown in FIG. 3 except that the electron beam source may be replaced with any suitable beam source known in the art. In addition, the output acquisition subsystem may be any other suitable beam-based output acquisition subsystem such as those included in commercially available focused ion beam (FIB) systems, helium ion microscopy (HIM) systems, and secondary ion mass spectroscopy (SIMS) systems. Other output acquisition subsystems or different systems, such as scanning near-field optical microscopy (SNOM), near-field scanning optical microscopy (NSOM), a scanning probe, atomic force microscopy (AFM), or other optical scanning that uses photons (e.g., TDI, photodiodes), can be used. Other optical imaging techniques (e.g., a camera, lens-lens imaging) also can be used. Thus, the particle beam can be an electron beam, ion beam, or light beam.

The computer subsystem 302 includes a processor 308 and an electronic data storage unit 309. The processor 308 may include a microprocessor, a microcontroller, or other devices.

The computer subsystem 302 may be coupled to the components of the system 300 in any suitable manner (e.g., via one or more transmission media, which may include wired and/or wireless transmission media) such that the processor 308 can receive output. The processor 308 may be configured to perform a number of functions using the output. The wafer metrology tool can receive instructions or other information from the processor 308. The processor 308 and/or the electronic data storage unit 309 optionally may be in electronic communication with another wafer metrology tool, a wafer inspection tool, or a wafer review tool (not illustrated) to receive additional information or send instructions.

The processor 308 is in electronic communication with the wafer metrology tool, such as the detector 307. The processor 308 may be configured to process signals generated using measurements from the detector 307. For example, the processor 308 may perform embodiments of the method 200.

In an instance, the processor 308 is configured to receive an image of a structure on the wafer; determine a contour of a structure in the image of the wafer; determine a simulated image of the structure from a design of the wafer; determine a contour of the structure in the simulated image; and compare the contour of the structure in the image and the contour of the structure in the simulated image. The simulated image accounts for noise sources and imaging properties of the wafer metrology tool. The processor 308 also can be configured to determine a difference in polygons between the contour of the structure in the image and the contour of the structure in the simulated image.

The processor 308 can be configured to determine a modified design of the structure based on the difference in polygons using the processor. The processor 308 also can be configured to determine a second simulated image of the structure from the modified design; determine a contour of the structure in the second simulated image; and compare the contour of the structure in the image and the contour of the structure in the second simulated image. The second simulated image accounts for noise sources and imaging properties of the wafer metrology tool.

The processor 308 can be further configured to report the difference in polygons when the difference in polygons is below a threshold.

The computer subsystem 302, other system(s), or other subsystem(s) described herein may be part of various systems, including a personal computer system, image computer, mainframe computer system, workstation, network appliance, internet appliance, or other device. The subsystem(s) or system(s) may also include any suitable processor 308 known in the art, such as a parallel processor. In addition, the subsystem(s) or system(s) may include a platform with high-speed processing and software, either as a standalone or a networked tool.

The processor 308 and electronic data storage unit 309 may be disposed in or otherwise part of the system 300 or another device. In an example, the processor 308 and electronic data storage unit 309 may be part of a standalone control unit or in a centralized quality control unit. Multiple processors 308 or electronic data storage units 309 may be used.

The processor 308 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 308 to implement various methods and functions may be stored in readable storage media, such as a memory in the electronic data storage unit 309 or other memory.

If the system 300 includes more than one computer subsystem 302, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems also may be effectively coupled by a shared computer-readable storage medium (not shown).

The processor 308 may be configured to perform a number of functions using the output of the system 300 or other output. For instance, the processor 308 may be configured to send the output to an electronic data storage unit 309 or another storage medium. The processor 308 may be further configured as described herein.

The processor 308 or computer subsystem 302 also can be part of a defect review system, an inspection system, a metrology system, or some other type of system. Thus, the embodiments disclosed herein describe some configurations that can be tailored in a number of manners for systems having different capabilities that are more or less suitable for different applications.

The processor 308 may be configured according to any of the embodiments described herein. The processor 308 also may be configured to perform other functions or additional steps using the output of the system 300 or using data from other sources.

The processor 308 may be communicatively coupled to any of the various components or sub-systems of system 300 in any manner known in the art. Moreover, the processor 308 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 308 and other subsystems of the system 300 or systems external to system 300.

For instance, the various steps described throughout the present disclosure may be carried out by a single processor 308 (or computer subsystem 302) or, alternatively, multiple processors 308 (or multiple computer subsystems 302). Moreover, different sub-systems of the system 300 may include one or more computing or logic systems. Therefore, the above description should not be interpreted as a limitation on the present disclosure but merely an illustration.

An additional embodiment relates to a non-transitory computer-readable medium storing program instructions executable on a processor for performing a computer-implemented method for determining a contour/design or other contour extraction, as disclosed herein. In particular, as shown in FIG. 3, electronic data storage unit 309 or other storage medium may contain non-transitory computer-readable medium that includes program instructions executable on the processor 308. The computer-implemented method may include any step(s) of any method(s) described herein.

Program instructions implementing methods such as those described herein may be stored on computer-readable medium, such as in the electronic data storage unit 309 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), CUDA, or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a particle beam source that generates a particle beam;
a stage configured to hold a wafer in a path of the particle beam;
a detector that receives particles from the wafer; and
a processor in electronic communication with the detector, wherein the processor is configured to:
receive an image of a structure on the wafer;
determine a contour of a structure in the image of the wafer;
determine a simulated image of the structure from a design of the wafer, wherein the simulated image includes at least one error that accounts for noise sources and imaging properties of the system;
determine a contour of the structure in the simulated image;
compare the contour of the structure in the image and the contour of the structure in the simulated image;
determine a difference in polygons between the contour of the structure in the image and the contour of the structure in the simulated image;
determine a modified design of the structure based on the difference in polygons;

determine a second simulated image of the structure from the modified design, wherein the second simulated image accounts for noise sources and imaging properties of the system;

determine a contour of the structure in the second simulated image; and compare the contour of the structure in the image and the contour of the structure in the second simulated image.

2. The system of claim 1, wherein the system is a scanning electron microscope.

3. The system of claim 1, wherein the particles are electrons and the particle beam is an electron beam.

4. The system of claim 1, wherein the processor is further configured to report the difference in polygons when the difference in polygons is below a threshold.

5. The system of claim 1, wherein comparing the contour includes dividing each segment into blocks with a fixed size and comparing the blocks of the structure in the image and the simulated image.

6. The system of claim 1, wherein comparing the contour includes matching one or more vertices along the contour in the image and the contour in the simulated image.

7. A method comprising:

directing a particle beam at a wafer using a wafer metrology tool;

generating, using a processor, an image of the wafer based on particles reflected from the wafer;

determining, using the processor, a contour of a structure in the image of the wafer;

determining, using the processor, a simulated image of the structure from a design of the wafer, wherein the simulated image includes at least one error that accounts for noise sources and imaging properties of the wafer metrology tool;

determining, using the processor, a contour of the structure in the simulated image; and comparing, using the processor, the contour of the structure in the image and the contour of the structure in the simulated image;

determining a difference in polygons between the contour of the structure in the image and the contour of the structure in the simulated image using the processor;

determining a modified design of the structure based on the difference in polygons using the processor;

determining, using the processor, a second simulated image of the structure from the modified design, wherein the second simulated image accounts for noise sources and imaging properties of the wafer metrology tool;

determining, using the processor, a contour of the structure in the second simulated image; and comparing, using the processor, the contour of the structure in the image and the contour of the structure in the second simulated image.

8. The method of claim 7, wherein the wafer metrology tool is a scanning electron microscope.

9. The method of claim 7, wherein the particle beam is an electron beam and the particles are electrons.

10. The method of claim 7, further comprising reporting the difference in polygons when the difference in polygons is below a threshold.

11. A non-transitory computer readable medium storing a program configured to instruct a processor to execute the method of claim 7.

12. The method of claim 7, wherein comparing the contour includes dividing each segment into blocks with a fixed size and comparing the blocks of the structure in the image and the simulated image.

13. The method of claim 7, wherein comparing the contour includes matching one or more vertices along the contour in the image and the contour in the simulated image.

14. The method of claim 7, wherein the particle beam has a high beam current configured to measure buried layers of the wafer.

* * * * *